(12) United States Patent
Huspeni et al.

(10) Patent No.: US 7,737,361 B2
(45) Date of Patent: Jun. 15, 2010

(54) SEALANT GEL FOR A TELECOMMUNICATION ENCLOSURE

(75) Inventors: Paul J. Huspeni, Keller, TX (US); Ziwei Liu, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 279 days.

(21) Appl. No.: 12/072,271

(22) Filed: Feb. 25, 2008

(65) Prior Publication Data

US 2009/0211810 A1 Aug. 27, 2009

(51) Int. Cl.
*H01R 4/00* (2006.01)

(52) U.S. Cl. .................. 174/74 R; 174/77 R; 174/84 R; 174/92; 528/76

(58) Field of Classification Search ................ 174/74 R, 174/76, 77 R, 84 R, 88 S, 92, 93, 70 A; 528/76, 528/79; 428/98, 221, 222, 424.6
See application file for complete search history.

(56) References Cited

U.S. PATENT DOCUMENTS

| | | | | |
|---|---|---|---|---|
| 3,359,351 A | * | 12/1967 | Bender | 264/46.9 |
| 3,605,046 A | * | 9/1971 | Miller | 333/242 |
| 3,981,947 A | * | 9/1976 | Kaufman et al. | 264/36.19 |
| 4,176,239 A | * | 11/1979 | Brauer et al. | 174/23 C |
| 4,444,976 A | | 4/1984 | Rabito | 528/60 |
| 4,486,725 A | * | 12/1984 | Majkrzak | 333/248 |
| 4,778,831 A | * | 10/1988 | Kemper | 522/18 |
| 4,913,964 A | * | 4/1990 | Fujii et al. | 428/379 |
| 5,229,453 A | * | 7/1993 | Roberts | 524/590 |
| 5,231,159 A | * | 7/1993 | Patterson et al. | 528/53 |
| 6,313,207 B1 | * | 11/2001 | Macfarland | 524/423 |
| 6,797,799 B1 | | 9/2004 | Slack et al. | 528/60 |
| 7,202,322 B2 | * | 4/2007 | Vedula et al. | 528/76 |
| 2003/0232899 A1 | * | 12/2003 | Markusch et al. | 521/155 |
| 2004/0127590 A1 | * | 7/2004 | Whinnery et al. | 521/159 |
| 2004/0198943 A1 | * | 10/2004 | Slack et al. | 528/60 |
| 2007/0098997 A1 | * | 5/2007 | Younes et al. | 428/423.1 |

FOREIGN PATENT DOCUMENTS

| | | |
|---|---|---|
| EP | 0529957 A1 | 3/1993 |
| EP | 1249460 A1 | 10/2002 |
| WO | WO2007/067393 | 6/2007 |

OTHER PUBLICATIONS

European Patent Office, European Search Report for EP Application No. 09002309.4, Jul. 15, 2009, 1 page.

* cited by examiner

*Primary Examiner*—William H Mayo, III
(74) *Attorney, Agent, or Firm*—C. Paul Lewallen

(57) ABSTRACT

A sealant gel for a telecommunication enclosure, wherein the gel is formulated from three different polyols. The first polyol is a polybutadiene-based polyol that has a low glass transition temperature. The second polyol is a polyether polyol. The third polyol is butene diol, which is a short molecule that quickly builds up a hard backbone structure.

20 Claims, 7 Drawing Sheets

SEALANT GEL FOR A TELECOMMUNICATION ENCLOSURE

BACKGROUND OF THE INVENTION

1. Field of the Invention

The present invention relates generally to sealant gels, and in particular relates to a sealant gel for an enclosure used in a telecommunication system.

2. Technical Background

Telecommunication systems typically have a number of locations where copper wires and/or optical fibers are terminated and/or that are connected (e.g., spliced) to other wires and/or optical fibers. These terminations and connections are preferably made within enclosures that have a sealed interior to prevent degradation of the connections or of the unspliced terminal ends of the fibers and/or wires from the surrounding environment.

For example, when fiber optic cables are spliced, the ends of the cables are often held within an enclosure called a "terminal seal" (or just "terminal" for short) to protect the ends of the cables and any connective equipment. Such terminals must cover and protect the cable ends from potential environmental damage caused by temperature variations, pressure variations, moisture, insects, dust, dirt, etc. The terminal necessarily includes one or more openings through which copper cables and/or fiber optic cables enter the terminal's interior region. Any openings so provided must be reliably sealed around the cables at the point of entry but still allow for manipulation of the cable by service personnel when necessary. At the same time, the terminals must be robust enough to securely hold the cables in place. The terminals may also need to withstand and maintain internal and external pressure differences due to environmental conditions, for example, temperature and pressure fluctuations or water immersion.

Some sealed enclosures rely on tape to close off any gaps leading to the enclosure interior formed between the particular cable and the opening through which it passes. Other sealed enclosures rely on a sealant gel to seal off any such gaps and to provide additional protection against the aforementioned environmental conditions.

For sealed enclosures deployed outdoors, any sealant gels used therein must be able to maintain their mechanical properties over the full range of outdoor environmental conditions. For example, a sealant gel must satisfy a number of environmental testing requirements including a heat-aging test wherein the gel is subject to a temperature of 90° C. for thirty days or 120° C. for a week. While it is relatively easy to formulate a soft polyurethane gel that has good viscoelastic properties at ambient (room) temperature, it is extremely difficult to form a soft polyurethane gel that can withstand 120° C. heat-aging for a week. The sealant gel must also perform well at subzero temperatures.

Some sealant gels are based on polyether-polyol. However, most polyether-polyol-based sealant gels degrade when exposed to high temperatures for an extended period. The degradation is a result of cross-linked network breakage, which causes the gel to melt and pool. Other sealant gels are formed from polyester based urethanes. However, such gels become brittle at subzero temperatures.

What is needed is as sealant gel for a telecommunication enclosure such as a terminal, wherein the gel maintains its key mechanical properties through environmental conditions, for example, over the full range between the high and low-temperature extremes the particular enclosures could experience when deployed in the field.

SUMMARY OF THE INVENTION

One aspect of the present invention is a sealant gel for a telecommunication enclosure such as a terminal seal used to terminate one or more ends of corresponding one or more telecommunication cables, such as fiber-optic cables and copper-wire cables. The sealant gel is formulated from at least three different polyols in a manner that maintains its favorable mechanical properties (e.g., its elastic and shear moduli and its viscosity) through environmental conditions, for example, over a wide temperature range. The first polyol is a polybutadiene-based polyol that has a low glass transition temperature that provides excellent low-temperature performance. The second polyol is a polyether polyol, which is very flexible and contributes the necessary viscoelastic properties. The third polyol is butene diol, which is a short molecule that quickly builds up a hard backbone structure that helps promote fast curing and provides resistance to cross-link network breakage at high temperatures.

The combined formulation for the sealant gel of the present invention builds up a well-balanced network structure that not only has all the necessary viscoelastic properties, but also withstands the highest required temperature of 120° C. while also exhibiting good performance at subzero temperatures.

Another aspect of the invention is a telecommunication enclosure that utilizes the sealant gel of the present invention. For example, one embodiment of such a telecommunication enclosure is a terminal seal where the sealant gel is contained in an endcap assembly arranged at one end of the terminal housing. The endcap assembly includes one or more openings through which corresponding one or more cable end portions can be inserted. The cable end portions are contained in an interior region of the housing below the end cap. The sealant gel in the endcap assembly conforms to the cable portion residing therein and makes sealing contact therewith so as to form a seal that prevents environmental contaminants from reaching the cable end portion that resides in the interior region. The sealant gel also makes sealing contact with the inside walls of the housing so as to complete the seal with respect to the interior region.

Additional features and advantages of the invention will be set forth in the detailed description that follows, and in part will be readily apparent to those skilled in the art from that description or recognized by practicing the invention as described herein, including the detailed description that follows, the claims, and the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description, serve to explain the principles and operations of the invention.

DETAILED DESCRIPTION OF THE PREFERRED EMBODIMENTS

Figure 1:
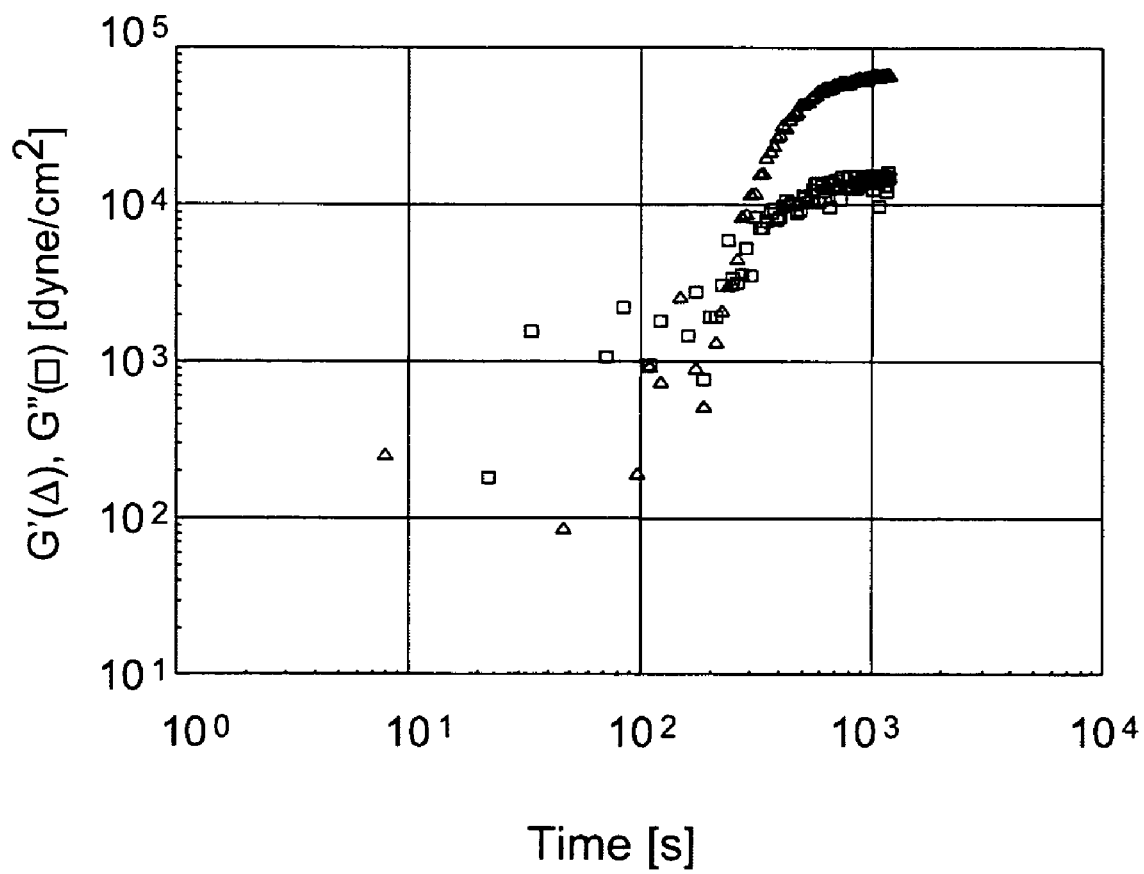
FIG. 1 is a plot of the elastic shear modulus G' and the viscous shear modulus G" (each measured in dyne/cm$^2$) as a function of time during cure at 25° C. for an example formulation of the sealant gel of the present invention as set forth in Table 1.

Reference is now made in detail to preferred embodiments of the invention, examples of which are illustrated in the accompanying drawings. Whenever possible, the same or like reference numbers and symbols are used throughout the drawings to refer to the same or like parts.

The present invention includes a sealant gel whose formulation is based on a mixture of three different chemically based polyols. The first polyol is a polybutadiene-based polyol. Due to the low glass transition temperature ($T_g$) of polybutadiene (−100° C.), it provides excellent low-temperature performance. The second polyol is polyether polyol, which is very flexible and contributes the necessary viscoelastic properties. The third is butene diol, which is a short molecule that quickly builds up a hard backbone structure that helps promote fast curing and provides high-temperature resistance. The combined formulation for the sealant gel builds up a well-balanced network structure that not only has all the necessary viscoelastic properties, but also withstands the highest required temperature of 120° C. while also exhibiting good performance at subzero temperatures (e.g., −40° C.) as well as over the range of temperatures in between.

An example embodiment of the formulation of the polyurethane-based sealant gel of the present invention comprises two parts A and B, with a 1A:(4.0 to 5.0) B by weight-mixing ratio, wherein parts A and B are as follows (MW=molecular weight):

Part A:

Diphenylmethane diisocyanate (MDI) prepolymer (e.g., from Baule USA): 100 parts

Part B:

| | |
|---|---|
| Hydroxyl terminated polybutadiene resin (MW~2700) | 100 parts |
| Polyether polyol (MW~2000) | 80-90 parts (best 84 parts) |
| Butene diol | 1-5 parts (best 2.5 parts) |
| Diisodecylphthalate | 100-300 parts (best 200 parts) |
| Irganox 1010 | 0.5-1 parts (best 1 part) |
| Carbon black | 0.1-0.2 parts |
| Tin catalyst | 0.5-1 parts (best 0.5 parts) |
| L-Paste | 1 part |

The present invention includes formulation variations within the above-identified ranges, with the "best parts" indicating the optimum number of parts for a preferred embodiment. Such formulations yield a correspondingly broad and useful range of softer or harder cured gel properties, which can be manipulated by those skilled in the art in order to best meet the particular end-product environmental sealing requirements.

It is noted that Irganox 1010 is a registered trademark of Ciba, Inc., and is a phenolic-based anti-oxidant that hinders thermally induced oxidation of polymers at high temperatures. Likewise, L-Paste is a moisture-absorbing compound used to reduce the formation of bubbles during curing. BAYLITH® L-paste is commercially available from Bayer Corporation, located at 100 Bayer Road, Pittsburgh, Pa. Also, Diisodecylphthalate is a non-toxic plasticizer having a chemistry compatible with the formulation of the sealant gel of the present invention.

Table 1 below sets forth several key properties for an example sealant gel formulation according to the present invention:

TABLE 1

| EXAMPLE SEALANT GEL FORMULATION | |
|---|---|
| Base Chemistry | polyurethane gel |
| Mix ratio (by weight) | 1A:4.4B |
| Gel set time @ 25° C. | ~240 s |
| Tensile Stress at break (kPa) | 129 |
| Elongation (%) | 581 |
| Hardness (Shore 000) | 55-62 |
| Aging one week @ 120° C. or 30 days @ 90° C. | No melting, no cracking, and <10% change in hardness |

The tensile test was performed using a modified ASTM D638 method. Standard Type IV 115 mm long, 3 mm thick tensile test bars were made by mixing and casting the CCS polyurethane gel in a Teflon mold containing Type UV tensile bar cavities. The resultant gel samples were cured for at least 24 hours at room temperature to achieve the best test specimens. The tensile properties were measured using an Instron Universal Testing Machine. The Instron cross-head speed employed was 101.6 mm/minute and the grip distance was set to 50.8 mm. A Shore 000 durometer was utilized to measure inverse gel hardness. In an example embodiment, the Shore 000 hardness of the cured sealant gel of the present invention is preferably equal to or less than 65.

The 25° C. gel cure schedule of the example sealant gel of Table 1 was measured using an ARES parallel plate rheometer. The ARES curing profile was analyzed and the crossover point of G' and G" was selected as the setting point. Here G' is the elastic shear modulus and G" is the viscous shear modulus, each measured in dyne/cm². FIG. 1 plots the cure curve based on G' and G" as a function of time. The cross-over point of G' and G" occurs at about 240 seconds.

Figure 2:
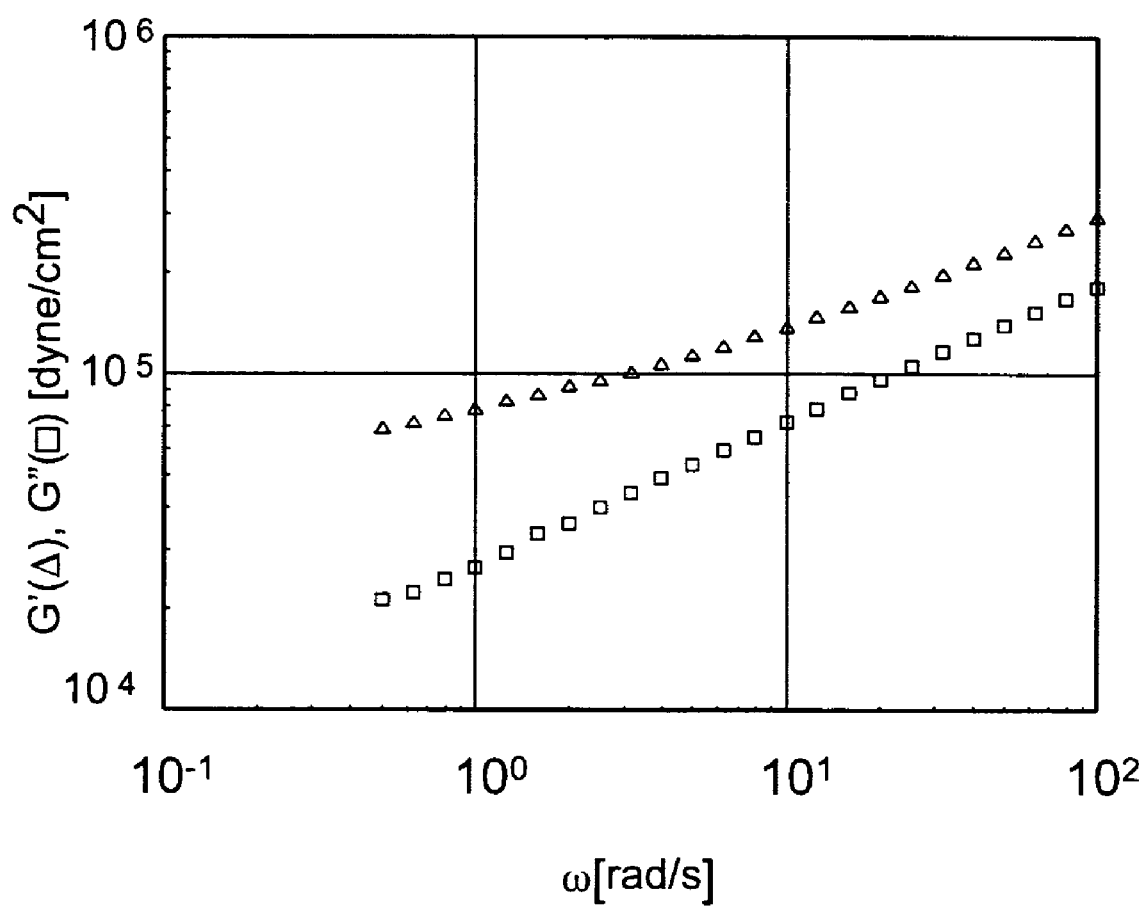
FIG. 2 is plot of the elastic shear modulus G' and the viscous shear modulus G" at 25° C. as a function of the shear frequency ω for the example sealant gel formulation of Table 1.

The viscoelastic properties G' and G" of the example sealant gel of Table 1 were characterized as a function of shear frequency ω using an ARES rotational rheometer and are plotted in FIG. 2 below. The shear frequency ω correlates to how rapidly the gel is strained during cable installation and small-dome closure (SDC) endcap sealing. The performance of a gel under these conditions is solely governed by its viscoelastic properties. From FIG. 2, it can be seen that the soft polyurethane sealant gel of the present invention has well-balanced viscoelastic properties over the entire frequency range as evidenced by the changes in G' and G" vs.

shear frequency ω being almost parallel for more than two orders of magnitude in shear frequency.

Figure 3:
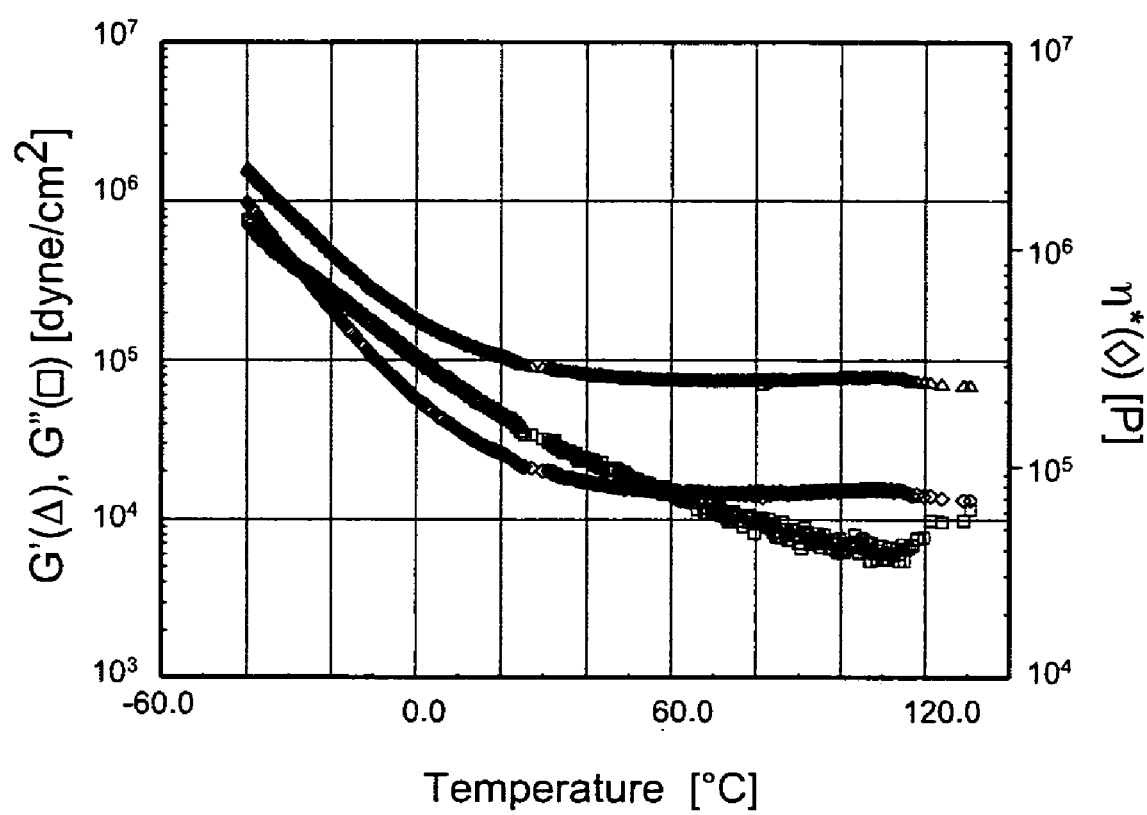
FIG. 3 is plot of the elastic shear modulus G, the viscous shear modulus G" (in dyne/cm² on the left-hand axis) and the complex viscosity η*(in Poise on the right-hand axis) a function of temperature (° C.) for the example sealant gel formulation of Table 1.

FIG. 3 plots the viscoelastic properties G' and G" as a function of temperature (° C.) from −40° C. to 120° C. The (complex) viscosity η*(in Poise P) is plotted on the right-hand vertical axis. The plot indicates that the elastic modulus G' and the viscosity η* of the gel remains constant from room temperature up to 120° C.

The relative constancy of η* and G' over the −40° C. to 120° C. temperature range permits the gel to remain optimally conformed to cables and closure sealing surfaces over this large temperature range. If these properties were to change significantly as a function of temperature sealing performance could be compromised. The plot of FIG. 3 shows that the sealant gel does not melt at high temperatures. Also, while the sealant gel hardens somewhat at the lower temperature extremes, the plot shows that the sealant gel still maintains an adequate degree of softness to perform its sealant function even at the extreme lower temperatures.

Example Telecommunication Enclosure

The present invention includes a telecommunication enclosure that utilizes the sealant gel of the present invention as described above. An example telecommunication enclosure in the form of a terminal seal or "terminal" as mentioned above is now described. The description of the terminal as presented below is based on U.S. patent application Ser. No. 11/881,518 assigned to Corning Cable Systems, LLC and entitled "Terminal with internal environmental seal," which patent application is incorporated by reference herein in its entirety.

Figure 4:
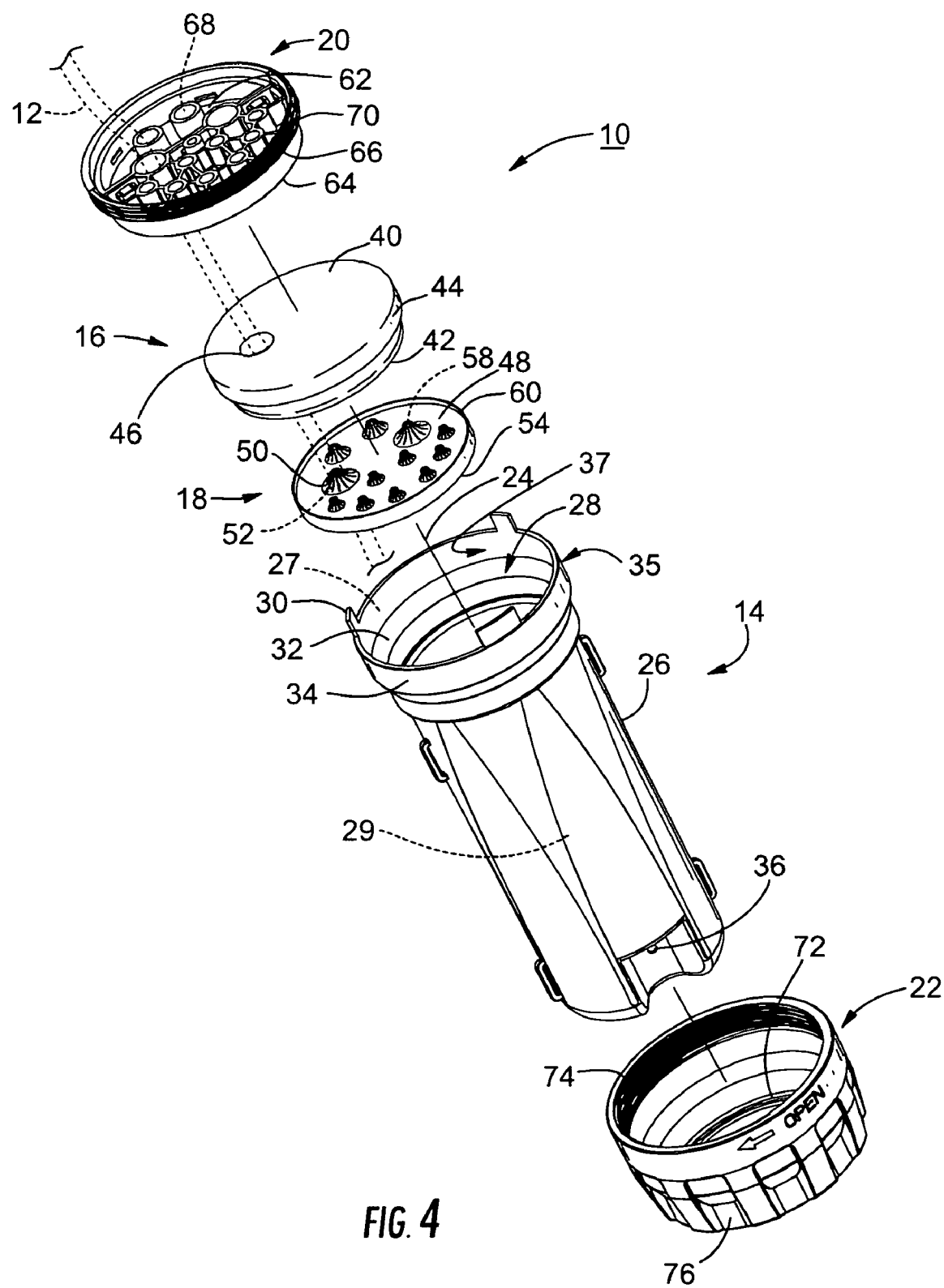
FIG. 4 is an exploded perspective view of an example of a telecommunication enclosure in the form of a fiber optic cable terminal that uses the sealant gel of the present invention.

FIG. 4 is an exploded view of an environmentally sealed enclosure in the form of a fiber optic cable terminal 10. A fiber optic cable 12, which may be spliced, terminated or joined, is illustrated in phantom for clarity. An end portion of fiber optic cable 12 is sealed by fiber optic cable terminal 10. Further embodiments of the environmentally-sealed enclosure include one or more input members, such as fiber optic cables, copper cables, conduits, pipes, and the like to provide non-limiting examples that pass into and/or out of the enclosure while maintaining the seal of the enclosure.

Fiber optic cable terminal ("terminal") 10 of the illustrated embodiment broadly includes a housing 14 that defines an interior area or an interior region 29. Terminal 10 also includes two independently movable or floating plates 18, 20, and a compression ring 22. Housing 14 includes an upper housing portion 35 having an inner surface 37. Housing inner surface 37 and plates 18 and 20 define a sealant chamber 15 (see FIG. 6) that contains the sealant gel 16 according to the present invention as described above (the sealant gel is positioned between plates 18 and 20). The sealant gel 16 and the two plates 18 and 20 may be stacked together as an assembly with the sealant gel 16 "pre-loaded" within sealant chamber 15 with a predetermined pressure. Plates 18 and 20 and sealant gel 16 contained therebetween form an endcap assembly through which one or more cable ends must pass in order to reach interior region 29.

When the pressure level within the interior region 29 differs from the ambient pressure level outside of housing 14, the sealant gel 16 is further compressed between the plates 18 and 20 as the plates move axially and independent of one another in response to the pressure differential.

The housing 14 is cylindrical in shape in this example and has a central or longitudinal axis 24. Surrounding the axis 24 is a wall 26 that defines an opening 27 and which forms a chamber, interior or volume 28 that in turn defines the aforementioned interior region 29. As shown, the housing 14 includes one or more projections or leading edges 30 that interact with the movable plate 20. The housing 14 further defines an internal shoulder or portion 32 and an opposing external shoulder or portion 34, which respectively interact with the plate 18 and the compression ring 22 as also described in greater detail below. Further, the housing 14 includes an air valve or conduit 36 for pressurizing the interior region 29 to test the assembled terminal 10 for potential leaks.

FIG. 4 also shows the sealant gel 16 located between the plates 18 and 20. Sealant gel 16 provides a dynamic seal about the portion of fiber optic cable 12 residing in sealant chamber 15 and also makes sealing contact with housing inner wall 35 so as to seal the interior volume 28 from insects, dirt, dust, liquids and other contaminants. As shown, sealant gel 16 has a first side or face 40 and an opposing second side or face 42, which faces define an outer sealing edge, periphery or peripheral area 44. One or more self-made holes or apertures 46 are formed through the sides 40 and 42 when corresponding ends of one or more respective lines or cables such as the fiber optic cable 12 are inserted through the sealant gel on their way into interior volume 28. Sealant gel 16 flows and conforms to the portion of the fiber optic cable 12 passing through the self-made apertures 46. The peripheral area 44 of sealant gel 16 also seals an inner surface 37 of the housing 14 when under compression to seal the interior region 29 as mentioned above.

The first or inner floating plate 18 shown in FIG. 4 also includes a first side or face 48 and a second side or face 54. The first side 48 most clearly shows a plurality of conduits or port fingers 50, each having a respective plurality of slits 52 disposed about respective holes 58. As known to those skilled in the art, the slits 52 of the port fingers 50 expand to facilitate passage of lines or cables, such as the fiber optic cable 12, through the holes 58. Once the fiber optic cable 12 is in a desired position, the port finger 50 grips the fiber optic cable 12 sufficiently tightly to hold the fiber optic cable 12 in the desired position. A complementary set of port fingers 56 may be located on the second side 54.

FIG. 4 further shows that the plate 18 may also include a circular ridge or flange 60. As described by way of an exemplary operation below, the flange 60 mates with a portion of the second side 42 of sealant gel 16 to assist in seating the plate 18 against the seal gel to form a tight seal under pressure.

Similar to the plate 18, the plate 20 shown in FIG. 4 is also a dynamic, independently movable plate, which also has a first side or face 62 and an opposing second side or face 64. As shown, the first side 62 includes a set of holes or apertures 68. Those skilled in the art will instantly recognize that some of the apertures 68 are sized relatively larger as entry and exit ports for distribution cables or are sized relatively smaller as drop ports for drop cables to exit the fiber optic cable terminal 10 to homes or businesses and the like. Still further, some of the apertures 68 are sized to accommodate various other sized cables (not shown) for other applications.

With continued reference to the plate 20 in FIG. 4, a flange 66 is shown proximate the first side 62 and carries a set of male or externally positioned helical threads 70. As explained below, these threads 70 engage complementary helical threads 74 of the compression ring 22 to assemble the fiber optic cable terminal 10 as shown in FIG. 5.

Figure 5:
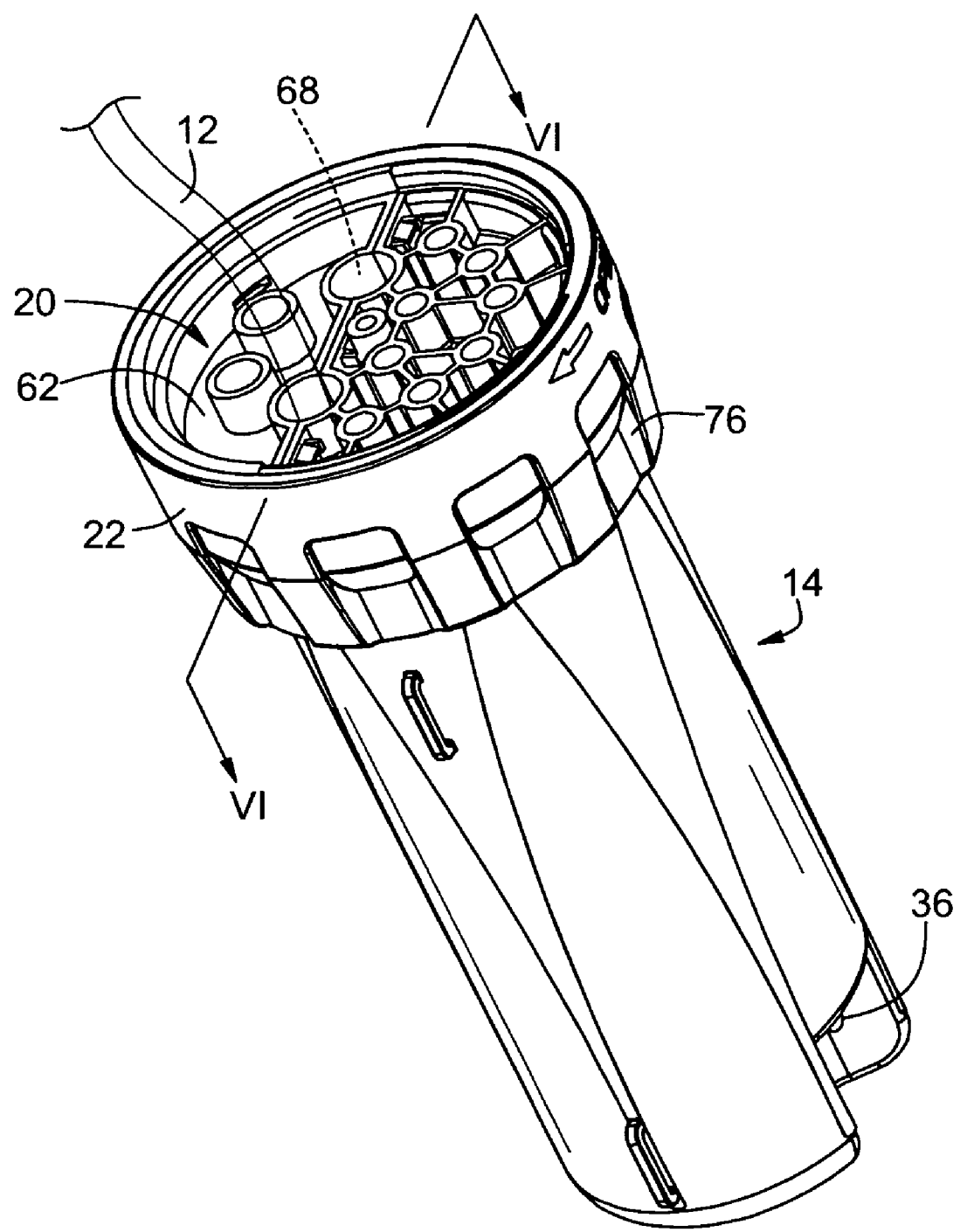
FIG. 5 is a perspective view of the assembled fiber optic cable terminal as shown in FIG. 4.

Now with particular reference to both FIGS. 4 and 5, the compression ring 22 includes a projection or inwardly projecting lip 72, the set of female or internally positioned helical threads 74 briefly introduced above, and a textured grip or knurled formations 76. The lip 72 may be a plurality of discretely spaced projections or may be circular or ringshaped as shown in this example. As explained in greater detail below, the lip 72 will selectively engage the external shoulder portion 34 of the housing 14 based on pressure changes. To do so, the threads 70, 74 must be screwed together or otherwise engaged. In this example, a technician upon task completion can slide the components of FIG. 4 together, including sliding the compression ring 22 over the housing 14 until the threads 70 of the exterior plate 20 abut the threads 74 of the compression ring 22. The technician may then twist the textured grip 76 to engage the threads 70, 74, which in turn compresses sealant gel 16 between the plates 18, 20. In the example shown in FIG. 5, the housing 14 and the compression ring 22 are hand tightened, but those skilled in the art will appreciate that a torque tool and meter may be used to tighten the components to specific pressure and torque readings if necessary.

Figure 6:
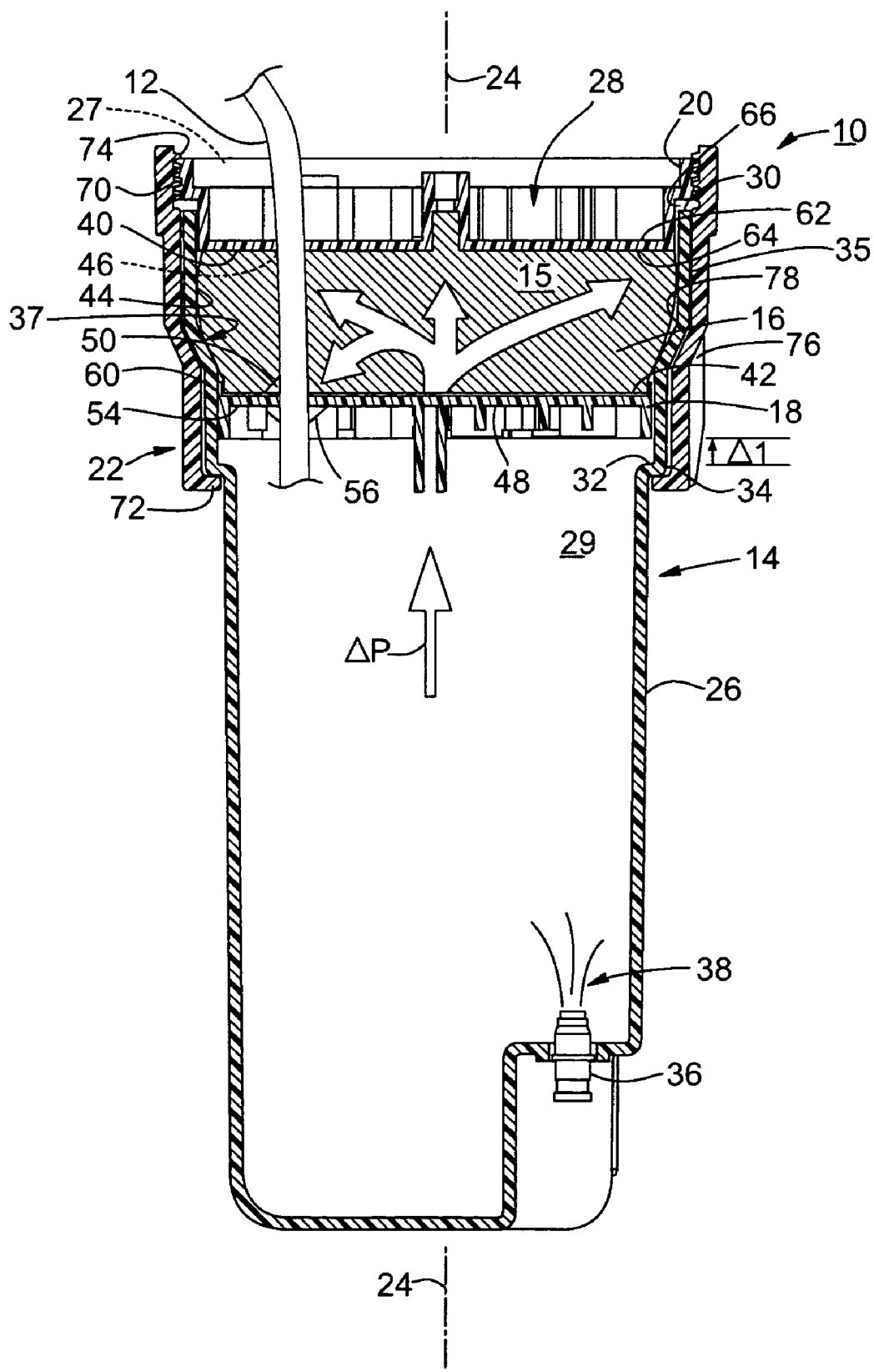
FIG. 6 is cross-sectional view of the fiber optic cable terminal taken along line VI-VI in FIG. 5, showing an increase of the internal pressure and the effect on the sealant gel.

FIG. 6 is a cross-sectional view of terminal 10 that shows detailed features and aspects of the embodiment illustrated in FIGS. 4 and 5. In particular, FIG. 6 shows a first step after assembly of the fiber optic cable terminal 10 by which a technician pressurizes the interior region 29 via the air valve 36, for instance, to about 5 to 10 pounds per square inch (psi) above ambient pressure as indicated schematically by air 38. The air valve 36 may be a Schrader poppet-type valve, a Presta-type valve or other suitable valve for pressurizing the interior region 29.

After pressurization, the technician may apply a thin film of soapy water (not shown) around the protruding cable 12, for instance, to visually inspect for bubbles, which could indicate a leak in the fiber optic cable terminal 10. The technician can also listen of course for escaping air that might suggest a leak. Assuming the technician does not hear or otherwise observe any leaks from the fiber optic cable terminal 10, the technician may release the excess air 38 and cap or otherwise seal the air valve 36. At this stage, pressure in the interior region 29 should be substantially equal to ambient or external pressure; i.e., no substantial pressure differential should exist at this point. Also, sealant gel 16 is under compression with a preloaded pressure as a result of having mated the housing 14 and the compression ring 22 together and having equalized the internal and external pressures.

With further reference to FIG. 6 (and now disregarding the air valve 36 and the air 38), a pressure condition is illustrated by an arrow $\Delta P$. This pressure condition $\Delta P$ may be caused by an external temperature increase that causes the air or gas in the interior region 29 to expand, which in turn causes the interior pressure to increase. As shown, the increased interior pressure pushes against the second side 54 of the plate 18, which urges the first side 48 against the second side 42 of the sealant gel 16.

Due to a chamfered area 78 of the housing 14, the sealant gel 16 is compressed both axially and radially as schematically illustrated in FIG. 6 by the bold arrows superimposed on the sealant gel 16. More specifically, the compressive force caused by the internal pressure increase is shown by the bold arrows to be more efficiently transferred throughout the sealant gel 16, which more effectively seals the cable 12 and the interior region 29. Alternatively stated, the chamfered area 78 funnels and transfers the compressive force to press the sealant gel 16 more rapidly and equally within the housing 14, about the cable 12 and around the port finger 50 as shown.

The force distribution shown in FIG. 6 is also apparent by a position change of the lip 72 of the compression ring 22. As shown, the lip 72 is caused to engage the external shoulder portion 34 of the housing 14 as indicated by the symbol $\Delta 1$. Accordingly, the increased internal pressure condition shown in FIG. 6 results in a tight seal due to independent movement of the plate 18. Although FIG. 6 appears to illustrate discrete pressure and position changes represented respectively by $\Delta P$ and $\Delta 1$, those skilled in the art will understand that these changes may be gradual with many gradations. In other words, the embodiment of FIG. 6 will react to a range of pressure changes and change positions of the plate 18 accordingly.

Figure 7:
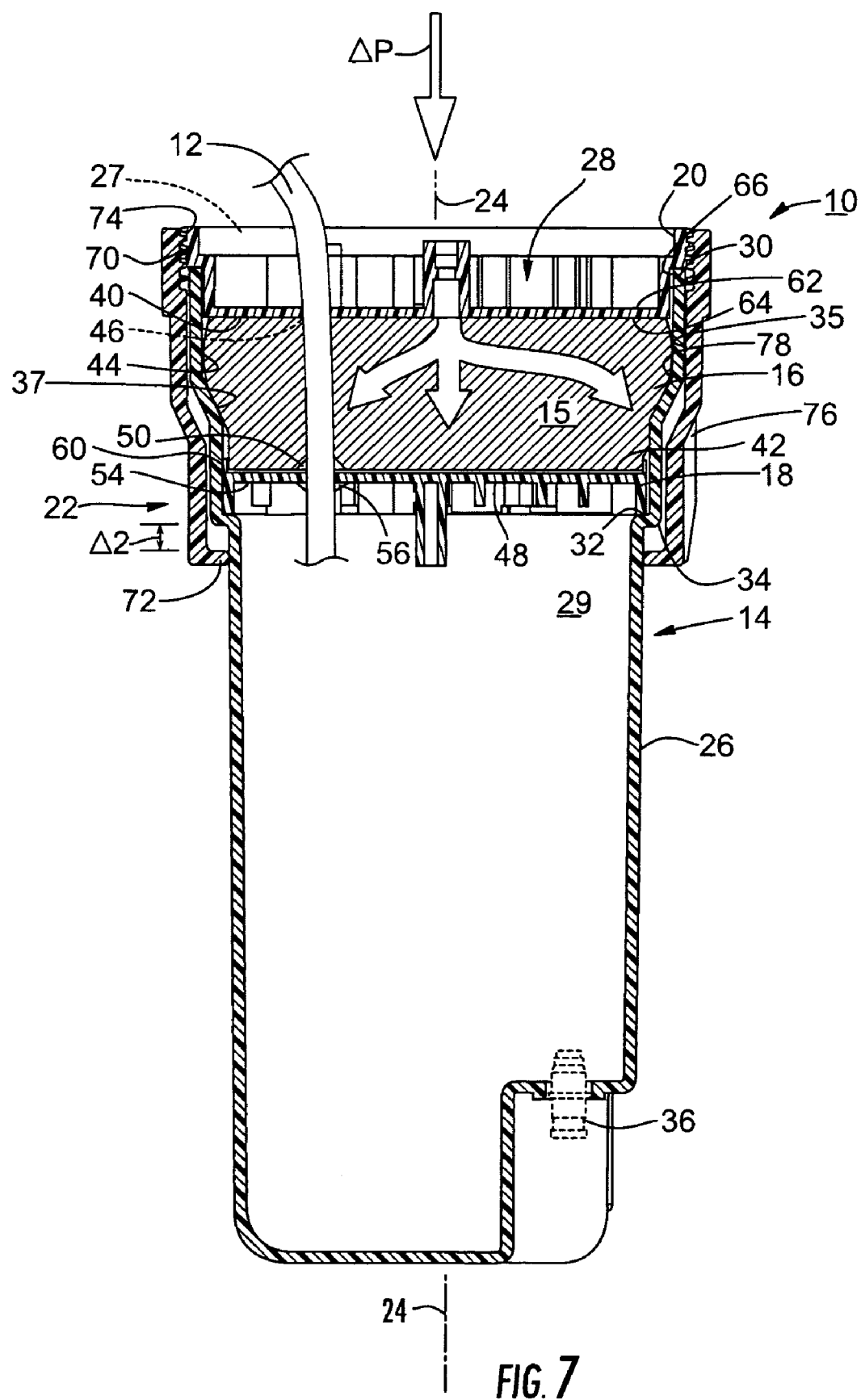
FIG. 7 is the same cross-sectional view of FIG. 6, but showing an increase in the external (ambient) pressure and the effect on the sealant gel.

Turning now to FIG. 7, another pressure condition is illustrated by the arrow $\Delta P$ shown external to the fiber optic cable terminal 10. In this example as external pressure $\Delta P$ gradually increases against the first side 62 of the outer plate 20, the sealant gel 16 is compressed both axially and radially, which is schematically illustrated in FIG. 7 by the bold arrows again superimposed on the sealant gel. As noted above, the chamfered area 78 assists in funneling and transferring the compressive force to press the sealant gel 16 against the interior of the housing 14, about the cable 12 and around the port finger 52 to form a tight seal against external contaminants.

Those skilled in the art will understand that the condition shown in FIG. 7 may be caused not only by the increased external pressure $\Delta P$ noted above but by a temperature decrease that can cause the gas in the interior region 29 to contract. In such a temperature change event, the plate 20 will behave similarly to the increased external pressure condition $\Delta P$. Moreover, since the fiber optic cable terminal 10 may be used underground or below grade, it may come into contact with water or other liquids. Accordingly, liquid pressure against the plate 20 may also cause the dynamic reaction described above. In all of these scenarios, the force distribution in FIG. 7 is again shown by reference to a position change of the lip 72 of the compression ring 22. As shown, the lip 72 is caused to disengage from the external shoulder portion 34 of the housing 14 as indicated by the symbol $\Delta 2$. Further, the edge 30 of the housing 14 is now shown engaged with the flange 66 of the plate 20 with the caveat again being that various interim positions of these components may be observed under various conditions.

It should be noted that the sealant gel of the present invention and the terminal of the present invention that uses the sealant gel have broad applications with respect to copper-based and/or optical-fiber-based telecommunication applications. Although the embodiments described herein referred to the use of fiber optic cables, fiber optic terminals and the like, further embodiments of the present invention include non-fiber based telecommunications closures and terminals, such as copper-based systems to provide one non-limiting example, while still further embodiments include environmentally sealed closures for non-telecommunications applications.

Accordingly, it will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A telecommunication enclosure for environmentally sealing and terminating at least one end portion of at least one cable, comprising:

a housing having a central axis, an upper portion having an inner wall, and a lower portion, wherein the lower portion defines an interior region configured to receive the at least one cable end portion;

upper and lower substantially parallel plates arranged in the housing upper region perpendicular to the central axis and configured to define in combination with the housing inner wall a sealant chamber adjacent the interior region and that contains a sealant gel, the upper and lower plates having at least one pair of corresponding apertures that allow for the at least one end portion to be inserted through the sealant chamber interior and the sealant gel contained therein when placing the at least one cable end portion into the interior region; and wherein the sealant gel is formulated from a first part A comprising an MDI prepolymer, and a second part B comprising a polybutadiene-based polyol, and a polyether polyol, and a butene diol, and wherein parts A and B are combined 1A:(4.0 to 5.0)B by weight-mixing ratio.

2. The telecommunication enclosure of claim 1, wherein the upper and lower plates are axially moveable to compress the sealant gel when a pressure differential exists between the interior region and the outside of the housing.

3. The telecommunications enclosure of claim 1, wherein the sealant gel forms an environmental seal around a portion of at least one cable residing within the sealant chamber, and wherein the sealant gel is in sealing contact with the housing inner wall.

4. A sealant gel for a telecommunication enclosure, comprising the following formulation:
a first part A comprising an MDI prepolymer;
a second part B comprising a polybutadiene-based polyol, a polyether polyol, and a butene diol; and
a 1A:(4.0 to 5.0) B by weight mixing ratio.

5. The sealant gel of claim 4, wherein the sealant gel, when cured, has a Shore 000 hardness of equal to or less than 65.

6. The sealant gel of claim 5, wherein the sealant gel has a viscoelasticity that, when the gel is cured, does not substantially change after the gel is subject to aging at 90° C. for 30 days.

7. The sealant gel of claim 4, wherein the polyether polyol has a molecular weight (MW) of about 2700.

8. The sealant gel of claim 7, wherein part A includes 100 parts of the MDI prepolymer, and wherein part B further includes:
100 parts of the hydroxyl terminated polybutadiene resin;
80 to 90 parts of the polyether polyol; and
1 to 5 parts of the butene diol.

9. The sealant gel of claim 8, wherein part B further includes
100 to 300 parts diisodecylphthalate;
0.5 to 1 part anti-oxidant;
0.1 to 0.2 part carbon black;
0.5 to 1 part tin catalyst; and
1 part moisture absorber.

10. The sealant gel of claim 9, wherein part B includes 84 parts of the polyether polyol; and
2.5 parts of the butene diol.

11. The sealant gel of claim 10, wherein part B includes:
200 parts of the diisodecylphthalate;
1 part of the anti-oxidant in the form of Irganox 1010; and
0.5 part of the tin catalyst.

12. A telecommunication enclosure comprising:
an interior region configured to receive at least a portion of at least one cable;
a sealant chamber arranged adjacent the interior region and configured to allow the at least one cable to pass therethrough when introduced the interior region; and
wherein the sealant chamber contains the sealant gel according to claim 9.

13. A telecommunication enclosure comprising:
an interior region configured to receive at least a portion of at least one cable;
a sealant chamber arranged adjacent the interior region and configured to allow the at least one cable to pass therethrough when introduced into the interior region; and
wherein the sealant chamber contains the sealant gel according to claim 4.

14. A sealant gel for a telecommunication enclosure, comprising the following formulation:
a part A comprising 100 parts of an MDI prepolymer;
a part B comprising:
i) 100 parts hydroxyl terminated polybutadiene resin
ii) between 80 and 90 parts polyether polyol having a molecular weight (MW) of about 2000;
iii) between 1 and 5 parts butene diol;
iv) between 100 and 300 parts diisodecylphthalate;
v) between 0.5 and 1 part anti-oxidant;
vi) between 0.1 and 0.2 part carbon black;
vii) between 0.5 and 1 part tin catalyst;
viii) 1 part moisture absorber; and
wherein part A and part B are combined 1A:(4 to 5)B by weight mixing ratio.

15. The sealant gel of claim 14, wherein the polyether polyol is provided in 84 parts.

16. The sealant gel of claim 15, wherein the butane diol is provided in 2.5 parts.

17. The sealant gel of claim 16, wherein the diisodecylphthalate is provided in 200 parts.

18. The sealant gel of claim 17, wherein the anti-oxidant is provide as Irganox 1010 in 1 part and the tin catalyst is provided in 0.5 part.

19. A telecommunication enclosure comprising:
A housing defining an interior region configured to receive at least a portion of at least one cable;
a sealant chamber arranged adjacent the interior region and configured to allow at the least one cable to pass therethrough to the interior region; and
wherein the sealant chamber contains the sealant gel according to claim 18.

20. A telecommunication enclosure comprising:
A housing defining an interior region configured to receive at least a portion of at least one cable;
a sealant chamber arranged adjacent the interior region and configured to allow at the least one cable to pass therethrough to the interior region; and
wherein the sealant chamber contains the sealant gel according to claim 14.

* * * * *